May 4, 1954 H. J. STEGEMAN 2,677,224
POWER-DRIVEN GANG LAWN MOWER
Filed July 14, 1950 3 Sheets-Sheet 1
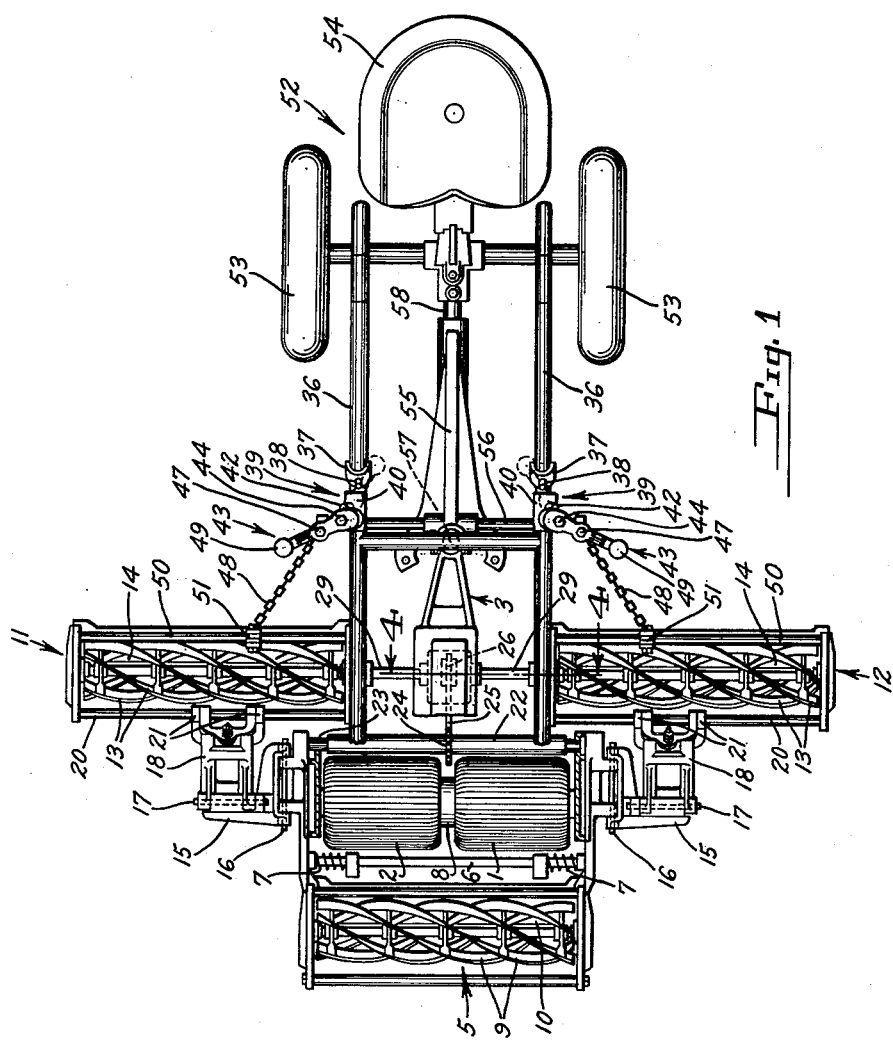
INVENTOR.
HENRY J. STEGEMAN
BY
ATTORNEY May 4, 1954     H. J. STEGEMAN     2,677,224
POWER-DRIVEN GANG LAWN MOWER
Filed July 14, 1950     3 Sheets-Sheet 2
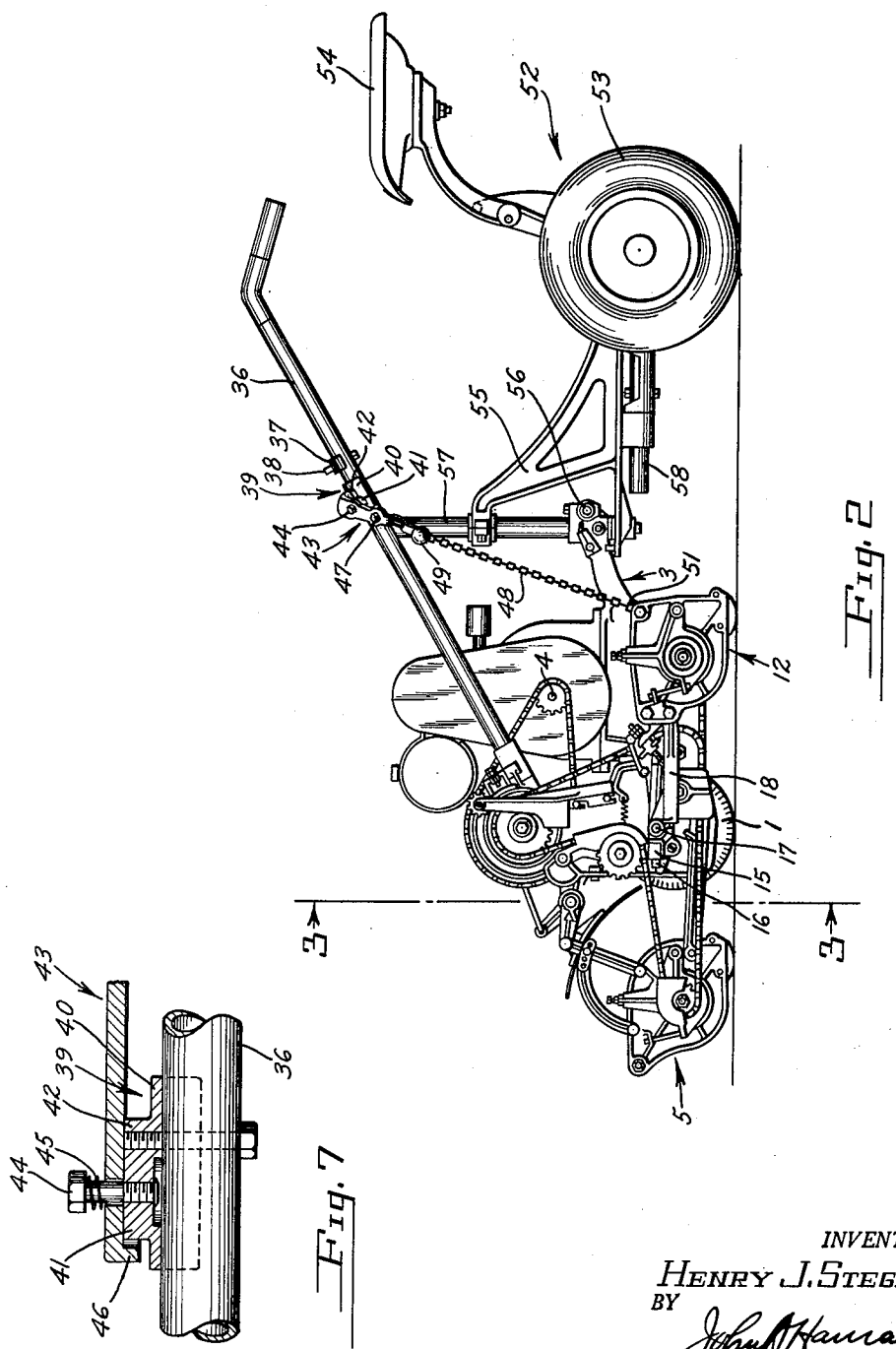
INVENTOR.
HENRY J. STEGEMAN
BY
John F. Hanrahan
ATTORNEY May 4, 1954     H. J. STEGEMAN     2,677,224
POWER-DRIVEN GANG LAWN MOWER
Filed July 14, 1950     3 Sheets-Sheet 3
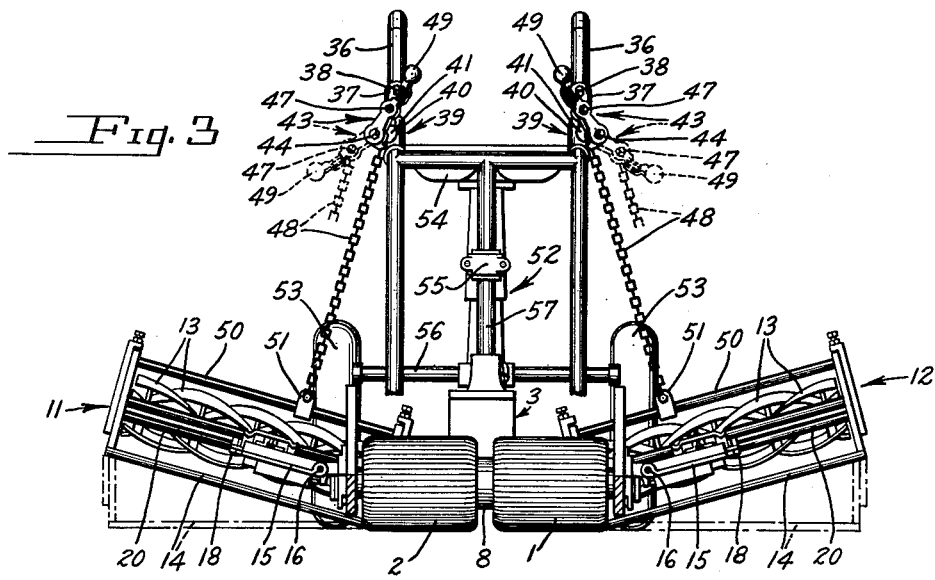
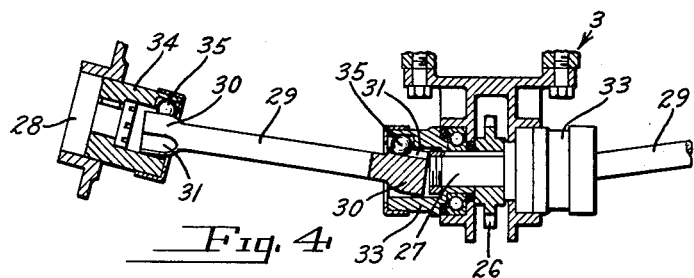
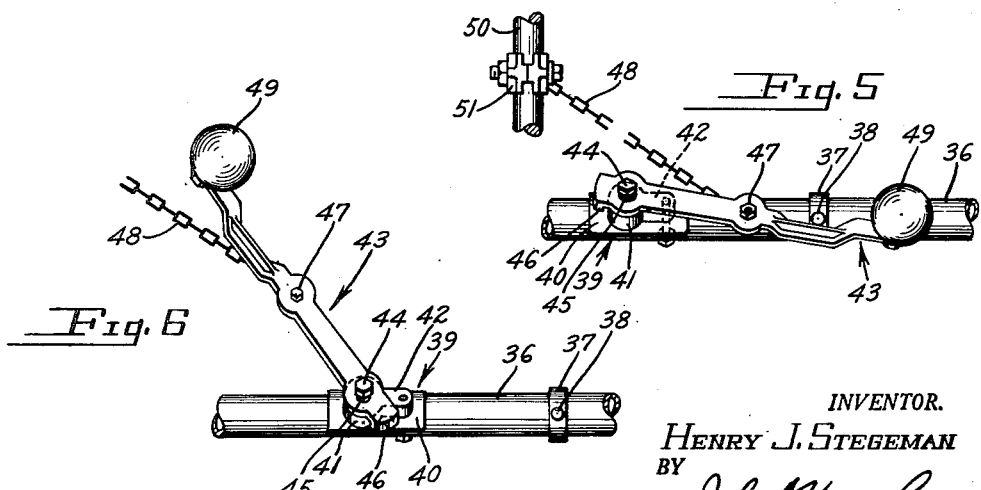
INVENTOR.
HENRY J. STEGEMAN
BY
*John F. Hanrahan*
ATTORNEY Patented May 4, 1954

2,677,224

UNITED STATES PATENT OFFICE 2,677,224

POWER-DRIVEN GANG LAWN MOWER

Henry J. Stegeman, Fairfield, Conn., assignor to The Locke Steel Chain Company, Bridgeport, Conn., a corporation of Connecticut Application July 14, 1950, Serial No. 173,766

4 Claims. (Cl. 56—7)

This invention relates to new and useful improvements in power-driven lawn mowers and the novel features of the invention will be best understood from the following description taken in connection with the annexed drawings in which I have shown a power-driven lawn mower having therein one embodiment of said novel features.

In the drawings:

Fig. 1 is a top plan view showing the power-driven lawn mower of the invention, parts being omitted and other parts being broken away and shown in section for the sake of clearness;

Fig. 2 is a side elevational view of the lawn mower, the view being taken as looking from the right in Fig. 1;

Fig. 3 is a front elevational view partially in vertical section taken on the line 3—3 of Fig. 2 of the mower as in Fig. 1 but with the side or lateral cutters shown in an inclined or tilted position by the full lines;

Fig. 4 is an enlarged view partly in longitudinal section and partly in elevation and showing the driving connection for one of the lateral cutters;

Fig. 5 is an enlarged detail plan view showing a portion of one of the mower handles and the means for tilting a side or lateral cutter to the full line position of Fig. 3;

Fig. 6 is a view similar to Fig. 5 but with the means in position wherein the lateral cutter is in a substantially horizontal functioning position; and Fig. 7 is an enlarged detail view partly in section and partly in elevation and showing details of construction of the means of Figs. 5 and 6.

The power-driven lawn mower forming the subject matter of this application is a development of the power-driven lawn mower disclosed in United States Letters Patent No. 1,944,584. Many of the parts shown in this application are the same or the equivalent of those disclosed in the mentioned Letters Patent and therefore are not described in great detail herein.

The mower comprises a traction means disclosed as a pair of ground engaging tractor or traction rolls 1 and 2 supporting a frame 3 having longitudinal sides and a fixed frame portion substantially centrally positioned between said longitudinal sides upon which is carried a suitable motor having a shaft 4 which, through suitable mechanism, drives the tractor rolls 1 and 2 and a front cutter generally designated 5. This cutter is pivotally mounted on the frame, being supported on a rod 6 and being counterbalanced by means of springs 7 which tend to lift the cutter and thus transmit a substantial amount of the cutter weight to the rolls 1 and 2. These rolls are driven through a differential connection 8 which permits relative rotative movement between the rolls 1 and 2 to facilitate a turning movement of the mower. The cutter 5 includes rotary knives 9 cooperating with a stationary knife 10.

Mounted on the sides of the mower, and to the rear of the rolls, is a pair of laterally extending side cutting units or cutters generally designated 11 and 12, respectively, which reference characters 11 and 12 also generally designate the respective cutter frames. Each of these cutter frames is provided with rotary knives or reels 13 and a stationary knife 14 which cooperate to cut grass in the usual manner. From Fig. 1, it will be clear that the knives on the cutters 11 and 12 extend behind the rolls 1 and 2 so that they overlap the knives on the cutter 5. As disclosed more particularly in the above mentioned patent, the side cutters, as they will be termed for convenience, are supported on the frame of the mower in such a way as to be counerbalanced and thereby to transmit a large portion of their weight to the frame and, consequently, to the rolls 1 and 2. The mentioned mounting of the side cutters are duplicates of one another and a description of one applies to both.

Thus, each cutter is supported on a first bracket 15 mounted on a longitudinal pivot 16 extending longitudinally of the mower, by which is meant parallel to the direction of travel of the mower. Extending at right angles to the pivot 16 is a transverse pivot 17 on the first bracket and on pivot 17 is mounted a second bracket 18. The inner and outer ends of the cutter reel are respectively substantially inwardly and outwardly of the axial line of the longitudinal pivot 16. As disclosed in the above mentioned patent, spring structures incorporated in or associated with these brackets provide cantilever constructions by which the weight of the cutter is transmitted from bracket 18 to bracket 15 to the frame 3, thus materially increasing the traction of the rolls 1 and 2 and at the same time providing other advantages.

At its rear end, each bracket 18 is provided with spaced ears which are apertured to receive a rod 20 on the front of the side cutter frame. Collars 21 may be provided on the rod to contact with said ears and hold the cutter in the desired position. The lateral or side cutters being mounted as described may have movement relative to the frame 3 whereby to follow the contour of the ground over which the mower may be passing. The pivotal mountings of the cutters are for other purposes, such as the permitting of the moving of the cutters into vertical positions for transportation or storage of the mower etc., but in the present instance, the pivotal mounting of the lateral or side cutters, particularly the mounting on the pivot extending longitudinally of the mower, has an additional special function.

The drives for the various cutters 5, 11 and 12 are fully set forth in the above mentioned patent and it is only a particular part of the drive that is of immediate interest here. Such particular drive part is that whereby although a side cutter is mounted in such a manner that it is possible for it to accommodate itself to the ground over which it passes, the cutter remains in relation to be driven by the motor of the present machine. This connection thus is such that it permits of the mentioned movement of the cutters without strain on the connection.

A cleaning roll 22, for the tractor rolls 1 and 2, is used as a convenient means for driving the side cutters. This roll is mounted on a shaft 23 driven from the motor. Mounted on the cleaning roll between the tractor rolls is a sprocket 24 engaging a chain 25 which runs over a sprocket 26 on a motor driven transverse shaft 27 supported on the frame of the mower. In Fig. 4, one of the connections to a side cutter is shown in section and part of the other in elevation, and since these connections are identical, the description of one will suffice.

Each of the side cutters includes a shaft 28 for driving the rotary blades and such shafts are normally disposed substantially in line with the shaft 27, variations taking place due to unequality in the ground, and the shaft 28 and the shaft 27 are connected together by a flexible driving connection consisting of a shaft section 29 having enlarged ends 30 in which are formed longitudinally extending grooves 31, these grooves being open-ended as in Fig. 4. Each of the ends 30 is received within a cage 33 being secured to the shaft 27 and the cage 34 being secured to the shaft 28 so that the two cages rotate with the respective shafts. In each cage is a plurality of driving members 35, here shown as balls, and each member is rotatably mounted in one of the grooves 31.

With this construction, the desired flexibility of the drive is achieved and the desired raising or tilting movement of the side cutters, for the purpose herein disclosed, is possible without disconnecting the mentioned drive or releasing and shifting of any of the parts. The drive is one which does not tend to resist the lifting or depressing of the cutter driven thereby and does not prevent the cutter from raising and falling to follow the contour of the ground, or from being raised and lowered for my present purpose.

The mower is provided with guide handles 36. These handles extend upwardly and rearwardly of the mower and form rigid parts of the frame 3. Mounted on the respective handles are manuals or manually manipulable or operable means for tilting the side cutters or raising the side cutters as from the dotted to the full line positions of Fig. 3 and for releasably retaining the cutters in such tilted or raised positions. The means mentioned are individual to the cutters whereby either or both of the cutters may be tilted or raised each independent of the other.

When the mower is in use, if a path or walk is to be crossed, it is desirable to raise the side cutters to protect them from injury and in the use of the machine it may be desired to raise one or both of the cutters to have it or them pass over a low obstruction or the like. In either instance, it would be the intention to immediately lower the cutter or cutters when the path or walk has been crossed or the obstruction passed so as to have the cutters immediately returned to have a cutting operation. Thus, it is desirable that means be provided for expeditiously raising or tilting the cutters and which means provide for the immediate lowering of the cutters when it is desired that they be lowered.

To the desired end, on each of the handles 36 there is rigidly fixed a mounting means or collar 37 carrying a short upstanding pin or stud 38. In spaced relation to the mountings or collars 37, brackets 39 are secured to the handles, such brackets being lower down on the handles or toward the cutters. Brackets 39 each include a plate-like mounting portion 40 shaped to seat against the upper side of the handle and such plate-like portions are rigidly fastened one to each of the handles in any desired manner. On the upper side of the plate-like portion 40 is a raised portion 41 and a projection 42 which portions may be a part of the same formation or separate formations rigid with the plate.

A manual in the form of a lever 43 is mounted in the bracket 39. This lever is pivotally anchored on the raised portion 41 by a bolt or stud 44 and interposed between the head of such bolt or stud and the intermediate portion of the lever through which it passes is a coil spring 45 constantly urging the intermediate portion of the lever against the raised portion 41 of the bracket 39. The short portion of the lever includes a downwardly directed lug 46 and connected with the longer portion of the lever intermediate the ends of the latter as by a bolt 47 is one end of a flexible connector 48 shown as comprising a chain. On the outer end of its longer portion, the lever is provided with a ball or other convenient hand piece 49 to be grasped by the hand for manipulation of the lever.

Fastened to a bar 50 of the side cutter frame is an attaching means or clip 51 to which is permanently fastened the other end of the flexible connector or chain 48. With special reference to Fig. 1, it will be noted that the clip 51 is mounted on the bar 50 about one-third out from the inner end of the latter but outwardly of the longitudinal pivot 16. Clearly, the lever 43 is mounted for pivotal movement by the bolt 44.

When these levers are in the full line positions of Figs. 1, 2 and 6, the side cutters 11 and 12 are in their positions of use or operation, i. e., the substantially horizontal dotted line positions of Fig. 3. At this time, the connections 48 being flexible, there is nothing to prevent the side cutters from rocking on their pivots so as to follow the contour of the ground over which the mower is passed. However, when the mower is to be moved over a walk, or when a low obstruction is in the path of movement of one of the side cutters, the lever 43 is manipulated to raise or tilt such side cutter or, in the case of a path, both levers are operated to raise or tilt both side cutters, to the full line positions of Fig. 3 by the operator, without stopping the mower or the operator leaving his seat.

To accomplish this and with particular reference to Fig. 6, the operator grasps the hand piece 49 and swings the same in a generally clockwise direction. This, through the flexible connection 48 and the clip 51, raises the side cutter, rocking it on the longitudinally extending pivot 16. The operator continues this movement and he also tilts the lever to have it pass over the top of the stud 38. Now he releases the lever and an intermediate portion of the latter is against the stud 38 (see Figs. 3 and 5) and the side cutter is supported in the tilted or raised position.

When moving the lever 43, it is necessary to tilt it to have it pass over the stud 38 and provision for this tilting resides in the coil spring 45 and its location. It normally tends to keep the lever against the raised portion 41 but will yield to permit of tilting of the lever for the purpose specified.

When the cutter is to be again lowered to normal horizontal functioning position, the operator again grasps the hand piece 49 and tilts the lever to a position where it will pass over the stud 38 and he permits the lever to swing in a substantially counter-clockwise direction, as from the position of Fig. 5 to that of Fig. 6. Raising and lowering of the cutters as indicated is not difficult since the cutters are counterbalanced as set forth in great detail in the above identified patent. Thus, the operator does not have to lift the entire weight of the cutter when he raises the same from the dotted to the full line position of Fig. 3. Then, again, when the cutter is lowered to functioning position, the flexible chain or connection 48 does not interfere with the movements of the cutter so that the latter may follow the contour of the ground over which it may be passing It is intended that the parts be positioned whereby the operator may manipulate either or both of the levers 43 to raise either or both of the side cutters while the operator is seated in a sulky generally designated 52. In order that the levers will never be out of reach of the operator riding on the sulky, the extension 42 of bracket 39 and the lug 46 on lever 43 are provided. With reference to Fig. 6, it will be noted that when the side cutter has been lowered, the lever 43 is held against further movement by engagement of its lug 46 with the extension 42.

Briefly, the sulky includes ground engaging wheels 53, a seat 54, and means 55 connecting the sulky with the frame of the mower. A cross bar 56 is adapted to be engaged by the feet of the operator for guiding of the mower. The connection of part 55 of the sulky is generally with a vertical post 57 rigid with the handles 36 and is thus about a vertical pivot post. Also, the seat and wheel structure of the sulky is pivoted to the part 55 for turning on a horizontal axis represented by the horizontal bar 58.

The construction is such that without leaving his seat 54, the operator may manipulate the levers 43 to raise and lower the side cutters. When the cutters are raised, if the lever is carried over the stud 38, the cutter is retained in its raised position, being suspended in part by the flexible connection or chain 48. It is but an instant's job for the operator, from his seat 54, to manipulate a lever 43 to raise a cutter and secure it in raised position, or release the cutter for movement to its substantially horizontal position. The flexible connection including the shaft section 29 permits of the raising of the side cutters without the breaking of the driving connection so that at the instant the side cutters are lowered, they are functioning and it is not necessary for the operator to dismount from the sulky for the connecting or disconnecting or otherwise adjusting of any parts.

Having thus set forth the nature of my invention, what I claim is:

1. In a power-driven lawn mower of the type including a frame having a rearward and upwardly extending handle, and a side cutter connected to said frame by means including a pivot extending longitudinally of the frame, the improvement comprising a lever pivoted at one end on said handle and having a hand grip at its other end, a flexible connector connected at one end to said lever at a point between its pivoted end and said hand grip and connected at its other end to said side cutter whereby on swinging of said lever in one direction said side cutter is rocked on said longitudinally extending pivot to a tilted position and thereafter on swinging of the lever in the opposite direction said side cutter is lowered to a substantially horizontal position, means for releasably securing said lever in the first named position, said last means including a stud on said handle over which said lever is passed to and from said position wherein the side cutter is in tilted position and against the side of which it is drawn by the weight of the tilted side cutter, and the pivotal mounting of said lever including yielding means whereby said lever may be rocked on said pivot in directions transverse to those in which it may be swung whereby to clear said stud.

2. In a power driven lawn mower, a traction roll supported frame having longitudinal sides and including a fixed frame part substantially centrally positioned between its longitudinal sides, a motor driven transverse drive shaft carried by said fixed frame part, a pair of rearwardly and upwardly extending rigid handles respectively connected at the respective sides of said frame for gripping by the respective hands of an operator positioned between said handles, a pair of side cutting units respectively at the respective sides of said frame, and each comprising a first bracket mounted on a longitudinal side of said frame on a longitudinal pivot parallel to the direction of travel of the mower, a second bracket mounted on said first bracket on a transverse pivot at right angles to said longitudinal pivot, a cutter frame supported on said second bracket, and a rotary cutter reel carried by said cutter frame for rotation about a transverse axis parallel to said transverse pivot and having its inner and outer ends respectively substantially inwardly and outwardly of the axial line of said longitudinal pivot, a pair of flexible driving connections respectively extending from said drive shaft to said respective cutter reels, and each adapted to permit limited raising and lowering and tilting movement of the respective cutting unit connected thereto without breaking the driving connection, a pair of manuals respectively mounted on said respective handles and shiftable relative thereto between cutter-lifted and cutter-lowered positions for individual and simultaneous operation by the hands of the operator, a pair of flexible connectors respectively connected between said respective manuals and the cutter frame of the cutter unit at its side of the mower, its point of connection with said frame being outwardly spaced from the axial line of said longitudinal pivot, and said connectors each being of a length whereby in the cutter-lowered position of said manual the cutter reel connected thereto is pivotally movable about said longitudinal and transverse pivots and in the cutter-lifted position of said manual said cutter reel is raised about said transverse pivot and is tilted about said longitudinal pivot to an upwardly and outwardly inclined position without breaking said driving connection.

3. The invention as defined in claim 2 further characterized by means to releasably retain said manual in a cutter lifted position short of the limit of tilt permitted by said flexible driving connection.

4. The invention as defined in claim 2 further characterized by counterbalancing means between the frame and said cutter transmitting to the frame a substantial amount of the weight of said cutter, and effective at least during a substantial part of the limited tilting movements permitted by said driving connection.

References Cited in the file of this patent

UNITED STATES PATENTS

| Number | Name | Date |
| --- | --- | --- |
| 1,279,267 | Coldwell | Sept. 17, 1918 |
| 1,944,584 | Stegeman et al. | Jan. 23, 1934 |
| 1,994,929 | Stegeman | Mar. 19, 1935 |
| 2,104,719 | Pol | Jan. 4, 1938 |
| 2,232,823 | Lull | Feb. 25, 1941 |
| 2,299,859 | Speiser | Oct. 27, 1942 |
| 2,475,671 | McCartney | July 12, 1949 |